(12) United States Patent
Joris

(10) Patent No.: US 8,998,106 B2
(45) Date of Patent: Apr. 7, 2015

(54) BOOM MOUNTING ASSEMBLY FOR AN AGRICULTURAL APPLICATION MACHINE

(75) Inventor: Hiddema Joris, Grubbenvorst (NL)

(73) Assignee: AGCO Netherlands B.V., Grubbenvorst (NL)

( * ) Notice: Subject to any disclaimer, the term of this patent is extended or adjusted under 35 U.S.C. 154(b) by 692 days.

(21) Appl. No.: 13/254,195

(22) PCT Filed: Mar. 1, 2010

(86) PCT No.: PCT/IB2010/000411
§ 371 (c)(1),
(2), (4) Date: Nov. 14, 2011

(87) PCT Pub. No.: WO2010/100542
PCT Pub. Date: Sep. 10, 2010

(65) Prior Publication Data
US 2012/0043396 A1  Feb. 23, 2012

(30) Foreign Application Priority Data
Mar. 2, 2009 (GB) .................................. 0903407.5

(51) Int. Cl.
*B05B 1/20* (2006.01)
*A01M 7/00* (2006.01)

(52) U.S. Cl.
CPC .............. *A01M 7/0053* (2013.01); *A01M 7/005* (2013.01); *A01M 7/0057* (2013.01)

(58) Field of Classification Search
CPC .. A01M 7/005; A01M 7/0053; A01M 7/0057
USPC ......... 239/164, 166, 159, 172, 160, 161, 163, 239/167, 168

See application file for complete search history.

(56) References Cited

U.S. PATENT DOCUMENTS 2,770,493 A * 11/1956 Fieber ............................ 239/168
4,522,841 A * 6/1985 Gille et al. ......................... 427/4
(Continued)

FOREIGN PATENT DOCUMENTS

AU  8858882 A  3/1983
DE  20018716 U1  5/2001
(Continued)

OTHER PUBLICATIONS

PCT International Search Report for Application No. PCT/IB2010/000411 dated Jun. 16, 2010.
Great Britian Search Report for Application No. GB0903407.5 dated Jun. 9, 2009.

*Primary Examiner* — Len Tran
*Assistant Examiner* — Alexander Valvis

(57) ABSTRACT

A boom mounting assembly (20; 120; 220) for attachment to an agricultural application machine (10) is provided. The assembly comprises a boom support frame (22) which is suspended from a primary frame (24) mounted to a chassis. The boom support frame comprises a transverse beam (35) for supporting an intermediate section of a fluid application boom (16). The suspension mechanism allows both yaw and pitch of boom support frame relative to the primary frame resulting from fore and aft forces on the boom. Dampers (50, 52) are each connected between the primary frame and the boom support frame at a position spaced from the transverse centre of the assembly. Damping of pitch and asymmetrical yaw movement of the transverse beam away from a neutral position is controlled by the first and second dampers.

13 Claims, 10 Drawing Sheets

(56) References Cited

U.S. PATENT DOCUMENTS

| | | |
|---|---|---|
| 4,561,591 A | 12/1985 | Ballu |
| 4,643,358 A * | 2/1987 | Jackson ........................ 239/166 |
| 4,880,160 A * | 11/1989 | Patterson et al. ............. 239/167 |
| 5,222,614 A | 6/1993 | Ballu |
| 5,887,390 A * | 3/1999 | Schulz et al. ................... 52/114 |
| 6,234,407 B1 * | 5/2001 | Knight et al. ................. 239/163 |
| 6,491,234 B2 * | 12/2002 | Beggs ........................... 239/166 |
| 7,913,930 B2 * | 3/2011 | Theeuwen et al. ............ 239/164 |

FOREIGN PATENT DOCUMENTS

| | | |
|---|---|---|
| EP | 343547 A1 | 11/1989 |
| EP | 572091 A1 | 12/1993 |
| GB | 2088181 A | 6/1982 |
| GB | 2184633 A | 7/1987 |
| WO | 2008/124720 A1 | 10/2008 |

* cited by examiner

BOOM MOUNTING ASSEMBLY FOR AN AGRICULTURAL APPLICATION MACHINE

The invention relates to a boom mounting assembly for attachment to an agricultural application machine.

Agricultural application machines such as crop sprayers comprise a large volume tank carried on a chassis. Such machines can be trailed behind a tractor or provided as a self-propelled unit having an integral cab and engine. The machine further comprises an extending boom which provides a transverse line of uniformly spaced spray nozzles connected by pipes to the tank. During operation the application machine is moved across fields of crops such as cereals and maize to apply liquid fertilizer or chemical treatment such as herbicides, fungicides and pesticides to the crop in a controlled manner.

The boom typically ranges from 10 to 40 metres in length when fully extended and is supported at an intermediate section of around 4 metres in length by a boom mounting assembly. This leaves a significant portion of the boom unsupported when fully extended and relying on only the rigidity of the boom structure to remain in position. The effects of forces applied to the extremities of the boom are exacerbated due to the moment of the unsupported portion.

Movement of the boom is known to include yaw, pitch and roll. 'Yaw' is pivoting movement of the boom around a central vertical axis. In other words, the left-hand side of the boom moves forwards whilst the right-hand side moves rearwards. Excessive yaw movement can result in uneven application of the spray to areas of the field. 'Pitch' is movement of the entire boom about a transverse axis and typically results from acceleration or deceleration of the vehicle. Excessive yaw movement can also result in uneven spray application. 'Roll' is movement of the boom around a longitudinal axis and typically results from the vehicle being driven over uneven terrain. Left uncontrolled, excessive roll can result in the extremities of the boom striking the ground thus risking damage to both the boom and the crop.

Oscillations in any direction can increase in amplitude to the extent where the machine must be stopped and restarted leading to inconvenience for the operator and an inefficient working approach.

To control the oscillations and movement of the boom extremities damping means are often provided to damp movement of the boom mounting assembly relative to the machine. Attempts have been made to control the various oscillations in a boom resulting in rather complex suspension and damping systems. Although capable of controlling movements of the boom, known systems comprise many components adding to the overall weight and complexity of the assembly.

It is thus an object of the invention to provide a simplified boom mounting assembly which can damp both yaw and pitch.

According to the invention there is provided a boom mounting assembly for attachment to an agricultural application machine, the assembly comprising a boom support frame which is suspended from a primary frame mounted to a chassis, the boom support frame comprising a transverse beam for supporting an intermediate section of a fluid application boom and being suspended so as to allow yaw and pitch of boom support frame relative to the primary frame, the assembly further comprising a first and a second damper each connected between the primary frame and the boom support frame at a position spaced from the transverse centre of the assembly, wherein damping of pitch and yaw movement of the transverse beam away from a neutral position is controlled by the first and second dampers.

Both pitch and yaw movement is damped with common dampers. The inventor has discovered that superior pitch and yaw damping is achieved by employing two spring/damper actuators which each damp movement either side of a neutral position. Advantageously, the need for separate spring/damper actuators for dedicated yaw and pitch control is thus avoided. The simplified assembly is cheaper to manufacture thus saving cost to the manufacturer and customer.

By spacing the attachment point of each damper away from the transverse centre, fore and aft movement of the respective ends of the transverse beam are independently damped. Pitch and yaw are both damped by the dampers.

The boom support frame is held in a neutral, or default, position wherein each end of the transverse beam can be displaced forwardly or rearwardly with all such fore and aft movements acting against the force of the dampers.

In a preferred arrangement each damper is connected between the primary frame and a respective bracket which is pivotally attached to the primary frame, and wherein each bracket is connected to a respective end of the transverse beam by a strut so that fore and aft movement of the beam is translated into at least partly vertical movement within the damper. The bracket may be an elbow bracket which is pivotally attached to the primary frame at the elbow. This delivers a number of advantages.

Firstly, the dampers can be located forwardly of the primary frame remote the side of the boom away from the applied chemicals.

Secondly, the provision of the elbow joint allows the dampers to be mounted in a substantially vertical position. Dampers which are mounted horizontally have been found to be more expensive to operate because a level of oil must be maintained in the chamber.

Thirdly, the elbow joints allow for a 'gearing' of the input-to-output moment by appropriate selection of the elbow extensions.

Preferably, the dampers each comprise a fluid-filled cylinder with a piston moveable therein. Such pneumatic or hydraulic cylinders require little maintenance thus saving cost and time. Furthermore, the pressure in chambers either side of the piston can be actively or passively set so as to provide active or passive (horizontal) damping respectively.

In an alternative arrangement the dampers can be replaced with a pair of co-acting springs to resist fore and aft movement respectively.

The invention provides damping for horizontal movement in two degrees of freedom. However, in a preferred embodiment the boom support frame is suspended so as to also allow the transverse beam to swing in a transverse vertical plane about the point of suspension. A preferred means of suspension is a ball joint which permits three degrees of freedom to the boom, namely yaw, pitch and swing. In this case, the assembly preferably further comprises damping means to damp said swinging movement in the transverse vertical plane away from a neutral central position.

The assembly may further comprise a transversely extending member and the damping means comprises third and fourth dampers each connected between the primary frame and respective ends of the transversely extending member so as to damp swing movements of the boom.

The boom support frame may comprise an upper portion which is suspended from the primary frame and a lower portion which includes the transverse beam, wherein the lower portion is pivotally attached to the upper portion so as to allow relative pivoting movement in a transverse vertical plane. This allows the boom to be levelled with respect to the ground when operating on side banks for example. Preferably a levelling cylinder is provided to adjust the angle of the lower portion with respect to the upper portion.

In an enhanced embodiment of the invention, damping means are provided to damp symmetrical yaw movement of the boom relative to the boom support frame. The inventor has recognised a fourth degree of freedom within which the boom oscillates, hereinafter called 'symmetrical yaw'. This involves movement of the boom relative to the boom support frame wherein each half of the boom moves around a yaw (vertical) axis in a symmetrical manner. In other words, the left-hand side of the boom moves forwards whilst the right-hand side also moves forwards. Symmetrical yaw is recognised as being different to both pitch and asymmetrical yaw.

Pitch movement involves forward and rearward movement of the boom and boom support frame relative to the primary frame, typically triggered by acceleration and deceleration of the sprayer. As mentioned above, pitch has been considered by known suspension assemblies, and attempts have been made to damp said movement.

Known movement around the yaw (or vertical) axis involves asymmetrical movement of the boom around said axis. In other words, the left-hand side of the boom moves forwards whilst the right-hand side moves rearwards. This movement will be hereinafter termed 'asymmetrical yaw' so as to differentiate this movement from 'symmetrical yaw'.

Symmetrical yaw, damped by this enhanced embodiment, is dependent upon the natural oscillation frequency of the boom which, in turn, is dependent upon the dimensions and construction thereof. Symmetrical yaw is not necessarily prevalent in shorter boom assemblies for example. By the very nature of symmetrical yaw, related movement of the boom is relative to the boom support frame instead of the primary frame. Therefore, any associated dampers are connected between the respective halves of the boom and the boom support frame.

In a preferred arrangement therefore said damping means comprises a fifth and sixth damper each connected between the boom support frame and a respective symmetrical yaw linkage which is connected to a respective half of the boom which is disposed to one side of the boom support frame. Each symmetrical yaw linkage may be pivotable within a range determined by a pair of stops fixed relative to the boom support frame, and wherein pivoting movement of the symmetrical yaw linkage is damped by the fifth and sixth dampers. Each symmetrical yaw linkage is preferably pivotable around an axis that is disposed between 15 and 35 degrees to the horizontal. Advantageously, this results in an inclined orientation of the fifth and sixth dampers that delivers favourable operation and thus long lifetime.

Each symmetrical yaw linkage preferably comprises a two-legged elbow element, wherein one of the fifth and sixth dampers is connected to a first leg of the elbow element, and a respective half of the boom is connected to a second leg of the elbow element.

The damping force offered by each of the fifth and sixth dampers is greater than the damping force offered by each of the first and second dampers. For example, the damping force offered by each of the fifth and sixth dampers may be at least twice that of the damping force offered by each of the first and second dampers. Advantageously, this ensures that first and second dampers contribute the majority of the damping force which counters asymmetrical yaw.

A boom mounting assembly in accordance with the invention is preferably embodied in an agricultural application machine comprising a tank and fluid delivery system. The assembly is preferably attached to the rear of the machine by a variable height mounting arrangement which allows the height of the boom to be varied. Advantageously, this allows the operator to select the optimal boom height for the prevailing wind speed and crop height.

In a preferred arrangement the variable height mounting arrangement comprises an upper link and a lower link each connected in a substantially parallel relationship between the rear of the machine and the primary frame in a pivotable manner. Advantageously, the dual link arrangement allows the assembly to be mounted to a chassis of the machine in a simple manner. This arrangement is particularly suitable for a chassis which is formed of a single longitudinal beam which offers limited options for boom mounting.

Preferably the variable height mounting arrangement further comprises an actuator connected between the machine and one of the upper link and lower link to lift and lower the assembly. Advantageously, this allows the operator to raise and lower the boom from the comfort of a cab.

Further advantages of the invention will become apparent from the following description of specific embodiments in which.

To facilitate an understanding of the principles and features of the invention illustrative embodiments are explained below. While the drawings illustrate and the specification describes certain preferred embodiments of the invention, it is to be understood that such disclosure is by way of example only. There is no intent to limit the principals of the present invention to the particular disclosed embodiments. The terms 'forward', 'rearward' and 'transverse' as used herein are all referenced to the longitudinal centre line of the chassis of the sprayer described moving in a forward direction. Equivalent components and features which are common to more than one embodiment will share reference numbers.

Figure 1:
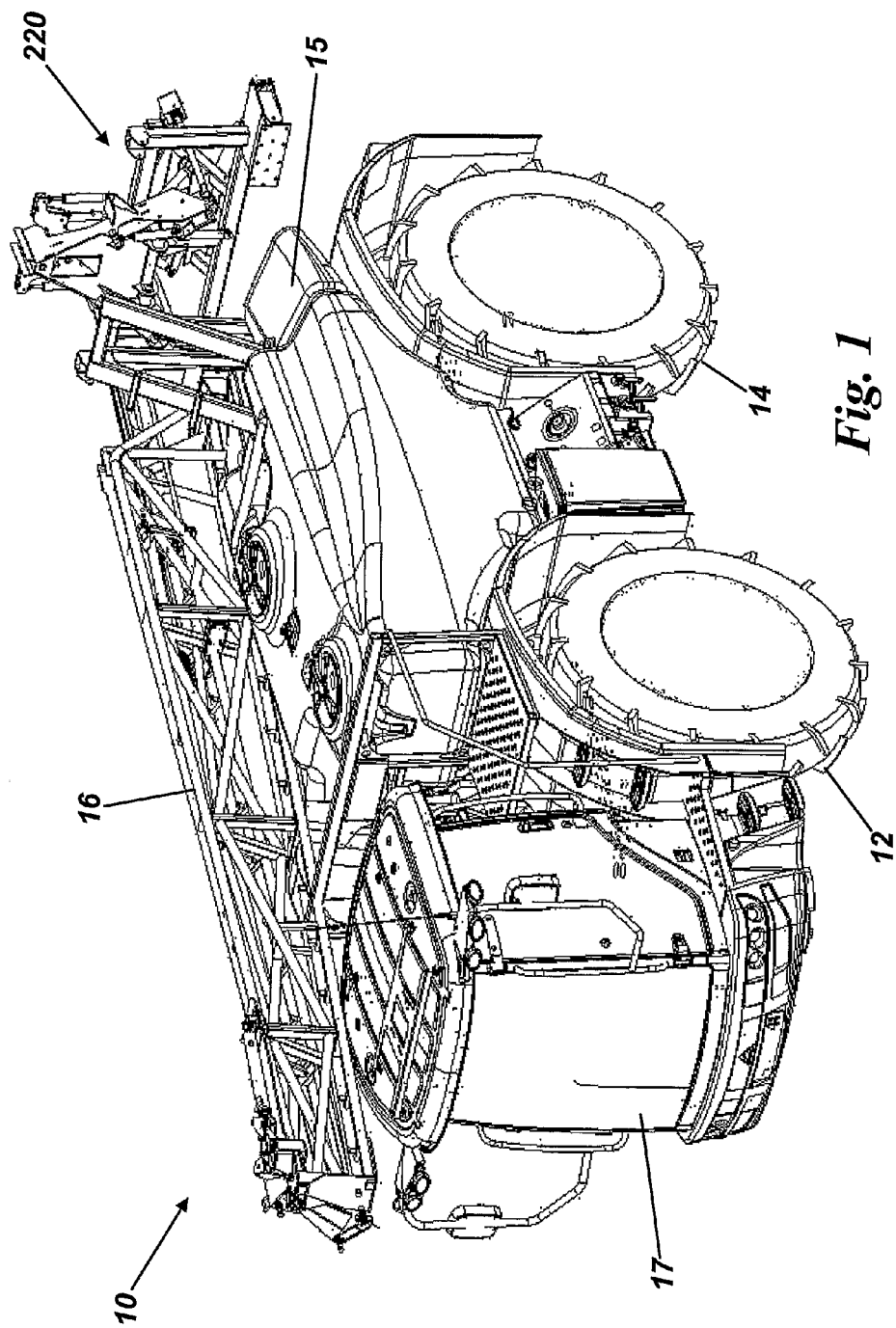
FIG. 1 is a perspective view of a self-propelled sprayer having a boom mounting assembly, showing only the right-hand side of the boom for clarity.
Figure 2:
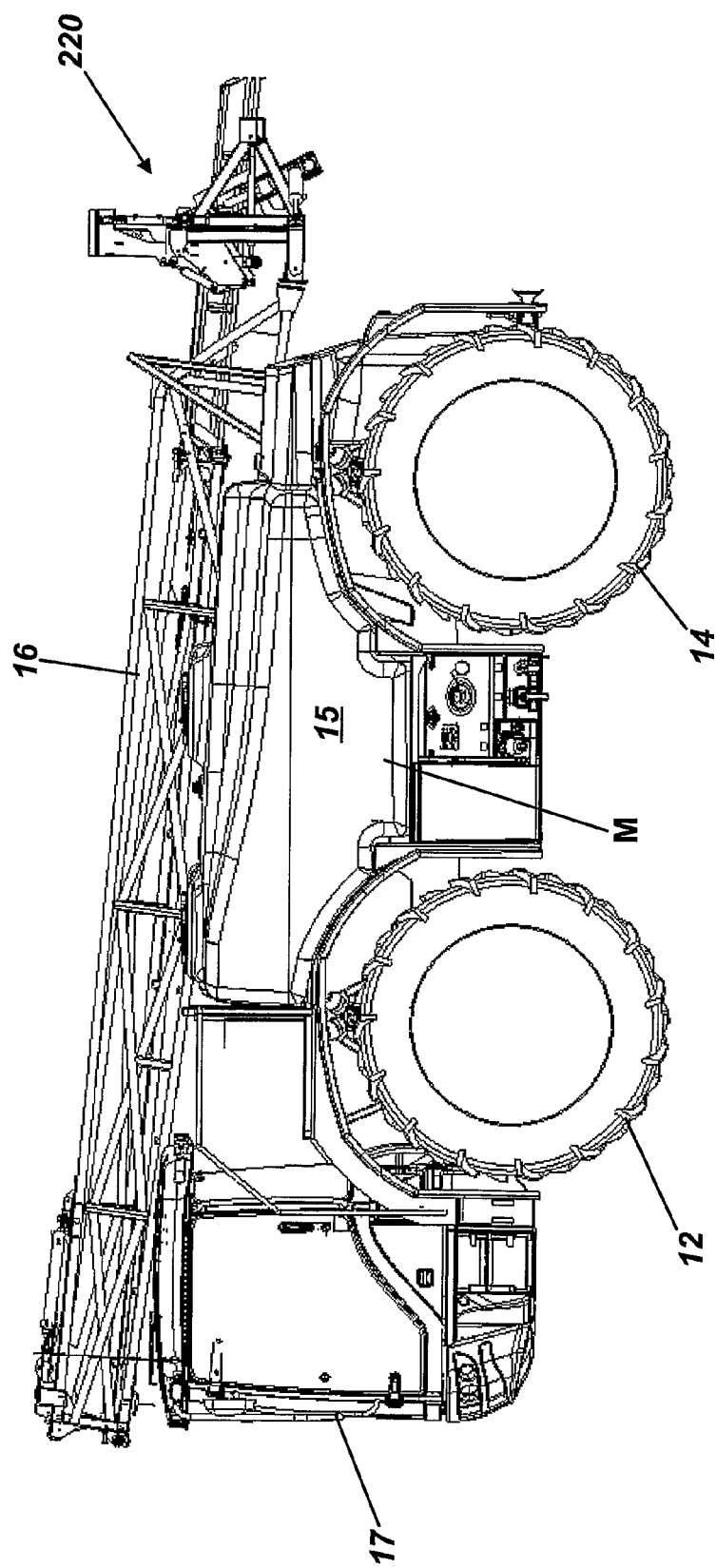
FIG. 2 is a side view of the sprayer of FIG. 1.

With reference to FIGS. 1 and 2, a self-propelled arable crop sprayer 10 comprises a pair of front wheels 12 and pair of rear wheels 14 each wheel being separately mounted to a chassis (not shown) by respective variable height suspension means. The sprayer 10 further comprises a tank 15, a boom 16 and driver's cab 17. The tank 15 accounts for the majority of the sprayer's volume and serves to hold the liquid material which is to be applied to a field. By way of example, the liquid material may comprise fertilizer or other chemical treatment such as herbicides, fungicides, pesticides or growth restrictors.

The liquid material is delivered in a controlled manner to spray nozzles (not shown) located on the boom 16 by a network of supply pipes (not shown). In the transport mode (shown in FIGS. 1 and 2) the boom 16 is retracted so as to remain substantially within the profile of the vehicle body thus allowing safe movement on the highway. In an operating mode the boom 16 is extended so as to provide a transversely extending boom, having a width of 24 metres for example. Driven across an arable field, the liquid material is sprayed onto the crop in strips 24 metres wide at a time. The driver located in cab 17 controls the steering of the sprayer and the control of the liquid material application.

Shown only in part in FIG. 1, the boom 16 is mounted to the sprayer 10 by a boom mounting assembly 220 located at the rear of the sprayer. The boom mounting assembly shown in FIGS. 1 and 2 is, in fact, the third embodiment described later.

Figure 3:
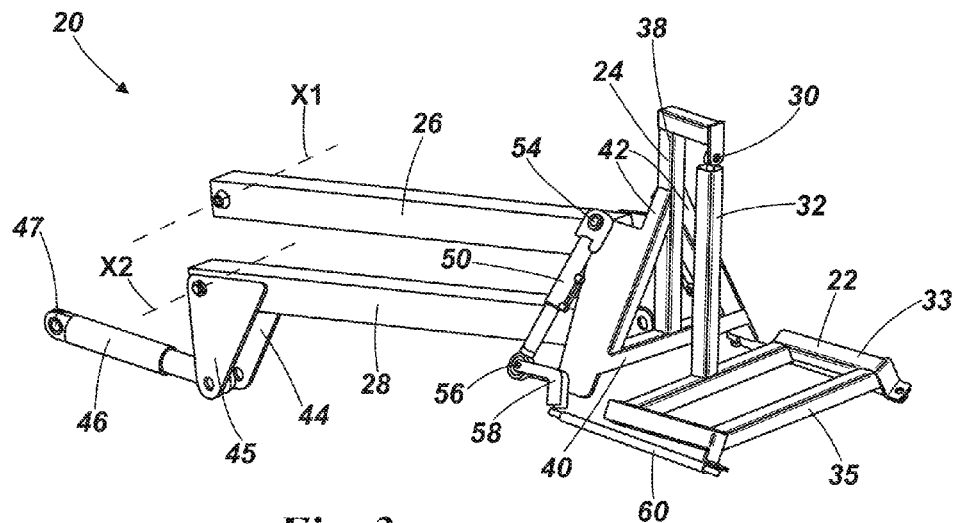
FIG. 3 is a perspective view of a boom mounting assembly in accordance with a first embodiment of the invention.

With reference to FIG. 3, which shows a first, more simplistic, embodiment of the invention, a boom mounting assembly 20 comprises a boom support frame 22 which is suspended from a primary frame 24 which is mounted to a chassis (not shown) by an upper link 26 and a lower link 28.

The boom support frame 22 is suspended from the primary frame 24 by a ball joint 30 which allows movement of the boom support frame in three degrees of freedom, namely swing, yaw and pitch, all of which will be described in more detail below. The boom support frame 22 comprises an upright member 32 welded at its lower end to a horizontal support structure 33.

An intermediate section (not shown) of boom 16 is secured to a transverse beam 35 which forms part of the boom support frame 22.

The primary frame 24 comprises an upright member 38, a lower transverse member 40 and two inclined members 42 welded so as to provide an A-frame structure. Upper link 26 and lower link 28 are pivotally attached to the forward side of primary frame 24. Similarly, at the opposite end, upper link 26 and lower link 28 are pivotally mounted to the chassis (not shown) of the sprayer 10. At the forward end of lower link 28 an extension bracket 44 provides an attachment point 45 for hydraulic actuator 46 which is secured to the chassis at its opposite end 47.

By operation of hydraulic actuator 46 the boom mounting assembly 20 can be raised and lowered with respect to the sprayer 10 with the links 26, 28 pivoting on respective axis X1,X2. This allows the operator to raise and lower the boom during operation. The parallel relationship of the links 26, 28 maintains the boom mounting assembly 20 at a constant angle with respect to the ground over the whole range of heights available.

With reference again to ball joint 30, the boom support frame 22 can move within three degrees of freedom as mentioned above. Firstly, the boom 16 can move within a transverse vertical plane which translates into a transverse rolling motion of the boom support frame 22. Such movement is typically caused by the sprayer operating over uneven terrain thus causing the boom to swing from side to side.

Secondly, the boom support frame 22 can swing in the longitudinal direction which translates into pitching of the boom 16. Such motion results from acceleration or deceleration of the sprayer 10. For example, during acceleration an aft force is exerted on the entire length of the boom 16 thereby causing a symmetrical rearward displacement of the boom support frame 22. Conversely, during deceleration of the sprayer 10, a fore force is exerted on the entire length of the boom 16 thereby resulting in a symmetrical forward displacement of the boom support frame 22.

Thirdly, ball joint 30 permits the boom support frame 22 and thus boom 16 to move around a yaw-, or vertical, axis. Movement around the yaw axis can equally be described as movement within a horizontal plane. Such motion can be caused by a turning of the sprayer 10 to the left or the right thus creating a fore force on one side of the boom 16 and an aft force on the other side of the boom 16. This translates into a displacement of the boom 16 which will be called asymmetric yaw (because one side moves forwards and one side moves rearwards).

In accordance with the invention the assembly 20 further comprises a first damper 50 and a second damper 52 each being arranged to independently damp both fore and aft movement of respective ends of the transverse beam 35 away from a neutral position. The two dampers 50, 52 damp both pitch and asymmetrical yaw movement of the boom 16 thereby providing an improved damping system compared to existing systems.

Figure 4:
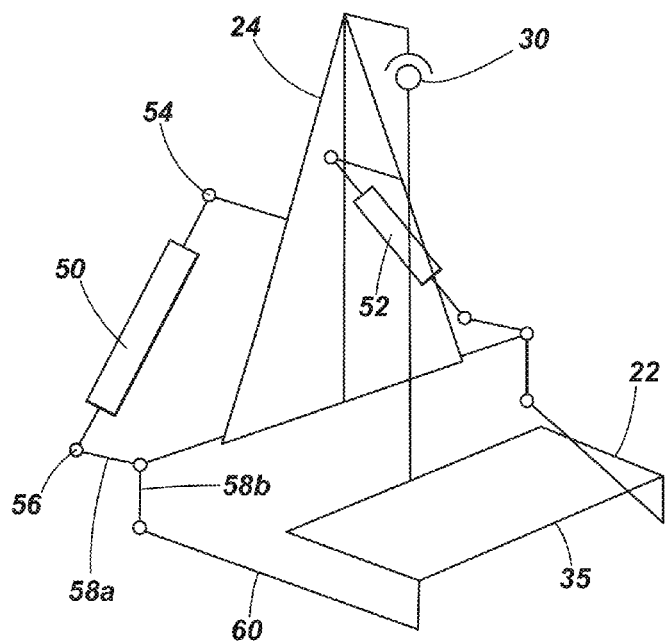
FIG. 4 is a schematic perspective view of the boom mounting assembly of FIG. 3.

With reference also to FIG. 4, damper 50 is connected at its upper end 54 to the forward side of inclined member 42 and at a lower end 56 to one limb 58*a* of an elbow bracket 58. Said elbow bracket 58 is pivotally attached to primary frame 24 at a lower end of corresponding inclined member 42. A strut 60 connects the second limb 58*b* of elbow bracket 58 to the left hand end of transverse beam 35. Second damper 52 is connected in the same manner with respective components.

Dampers 50, 52 include a piston moveable therein and a fluid chamber located either side thereof. In this example, the chambers are sealed which provides a passive damping function in that the respective chamber pressures are fixed. Displacements of the piston either side of a neutral position (caused by displacement of the boom support frame 22) are damped such that positioning of the boom support frame 22 is always biased towards the neutral position within both horizontal degrees of freedom, namely pitch and yaw.

Springs, not shown in FIG. 3 or 4, are connected in parallel to the dampers to provide a returning force which biases the boom support frame back to a neutral position when displaced therefrom.

Horizontal movement of each end of transverse beam 35 is translated by elbow bracket 58 into movement substantially aligned with each associated cylinder 50, 52. However, it is envisaged that each damper 50, 52 could instead be connected directly between the primary frame 24 and the boom support frame 22 without deviating from the scope of the invention.

Figure 5:
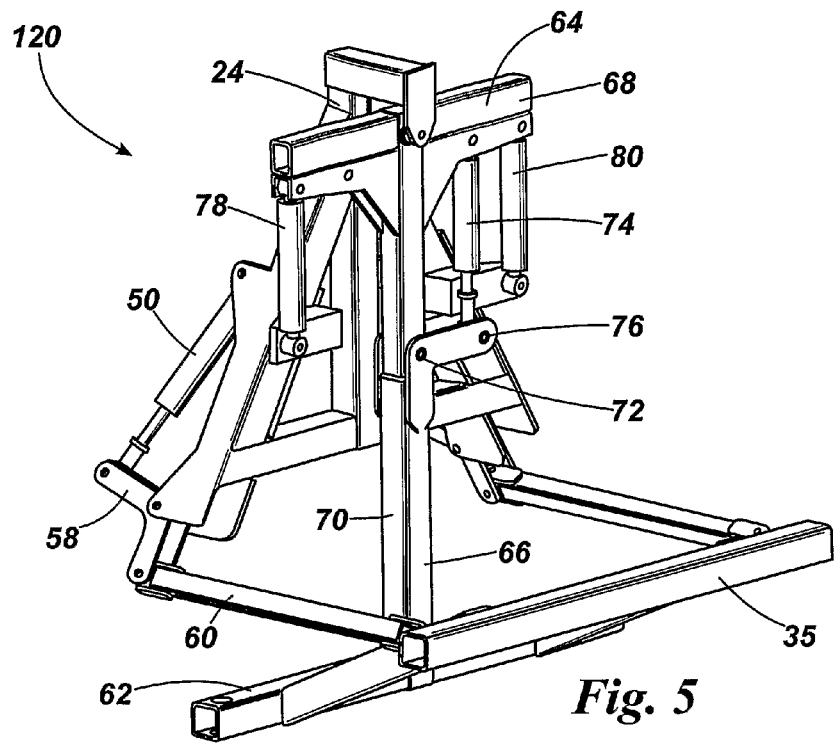
FIG. 5 is a perspective view of a boom mounting assembly in accordance with a second embodiment of the invention showing the support frame in a neutral position.
Figure 6:
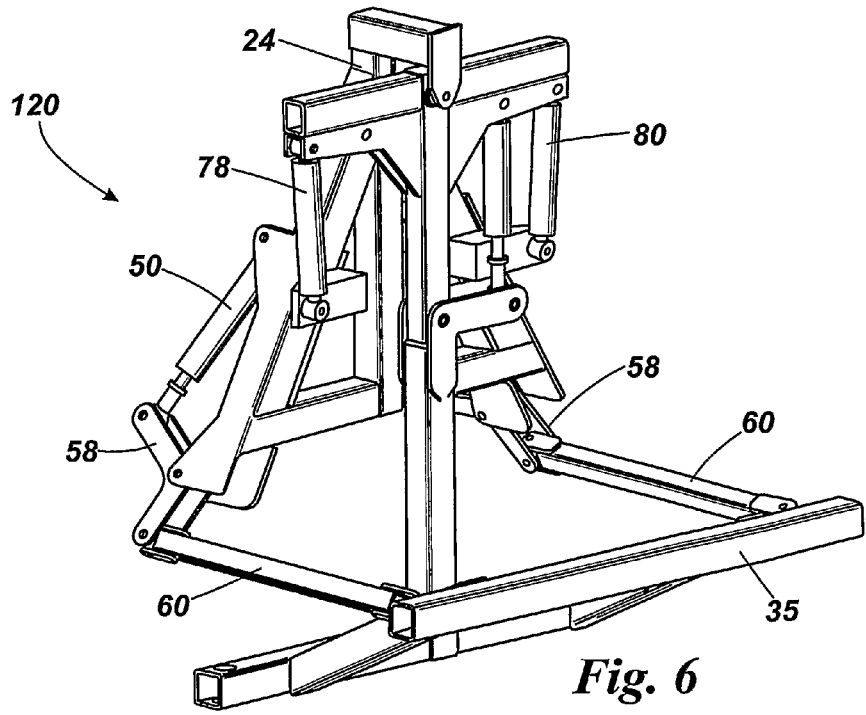
FIG. 6 is a perspective view of the boom mounting assembly of FIG. 5 showing the support frame displaced with positive yaw.
Figure 7:
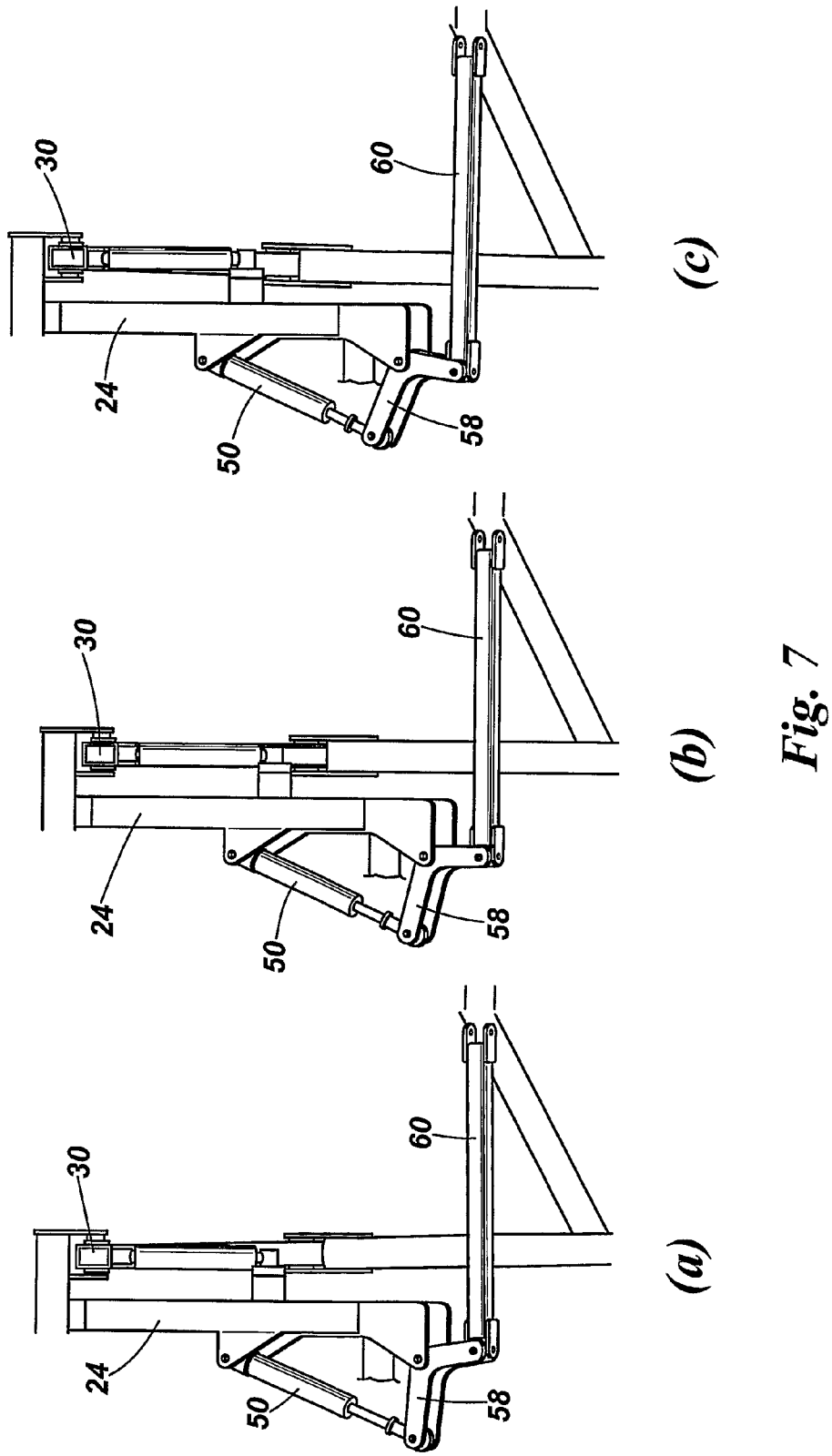
FIG. 7 is a side view of the boom mounting assembly of FIG. 5 showing the support frame displaced with varying degrees of pitch.

Referring now to FIGS. 5, 6 and 7, a second embodiment of the invention includes a boom mounting assembly 120 with a primary frame 24 having a similar structure to that described above. However, in this example, rolling motion of the boom 16 is also damped. The boom support frame 62 comprises an upper portion 64 and a lower portion 66. The upper portion 64 comprises a transverse member 68 which provides connection points for dampers to be described below.

The lower portion 62 includes a transverse beam 35 for securing of the intermediate section of boom (not shown in FIGS. 5-7). Furthermore, an upright member 70 is pivotally attached at 72 to the upper portion 64 so as to allow relative pivoting movement in a transverse vertical plane. A levelling cylinder 74 is connected between the transverse member 68 and a bracket 76 which extends from the top of upright member 70.

By appropriate control of cylinder 74 the angle between upper portion 64 and lower portion 62 can be adjusted, independent of any damping, so as to allow the boom to be positioned substantially parallel to the ground when operating over side banks of differing inclines.

Cylinders 50 and 52 are connected via elbow brackets 58 to the transverse beam 35 in a similar manner to the embodiment of FIG. 3 and will, therefore, not be described any further. Also, springs, not shown in FIG. 5, 6 or 7, are connected in parallel to the dampers to provide a returning force which biases the boom support frame back to a neutral position when displaced therefrom.

A third damper 78 and fourth damper 80 are each connected between a respective end of transverse member 68 and primary frame 24. In a similar manner to dampers 50 and 52, third and fourth dampers 78, 80 damp motion away from a neutral position which is defined by the position of a piston within each cylinder. However, in this case, third and fourth dampers 78, 80 serve to damp transverse rolling movement of the boom 16 which typically results from operating over uneven ground.

Therefore, in this example, pitch, asymmetric yaw and roll away from a neutral position are damped by the four dampers 50, 52, 78, 80. This prevents oscillations from persisting in the respective degrees of freedom.

Figure 8:
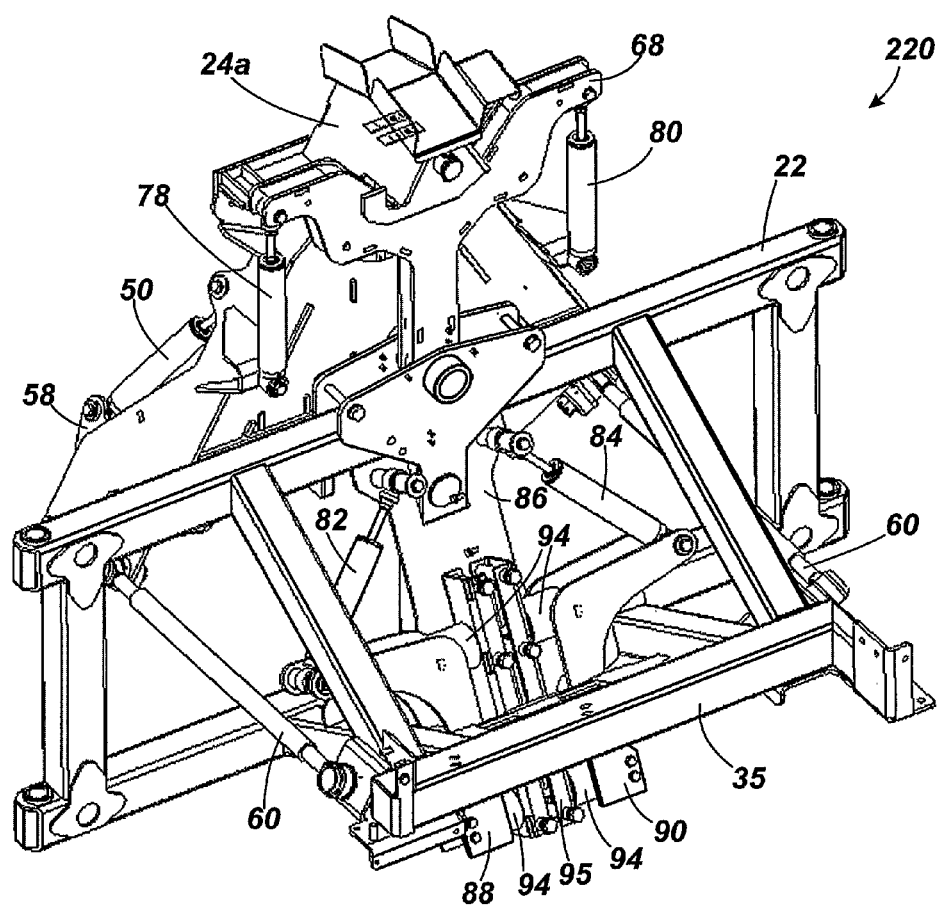
FIG. 8 is a perspective view of a boom mounting assembly in accordance with a third embodiment of the invention.

A third embodiment is shown in FIGS. 8 to 12 which is a development of the second embodiment of FIG. 5. The boom mounting assembly 220 shown in FIG. 8 comprises a primary frame 24 which by mounting means (not shown) is attached to the rear of a sprayer chassis. In a similar manner to the embodiments described above, a boom support frame 22 is suspended from the primary frame 24 by means of a ball joint 30. It should be appreciated that the ball joint 30 is hidden from view in some figures due to protective sheet metal 24a (FIG. 8).

As above, the ball joint 30 permits movement of the boom support frame 22 relative to the primary frame 24 with three degrees of freedom, namely roll, pitch and yaw.

Figure 10A:
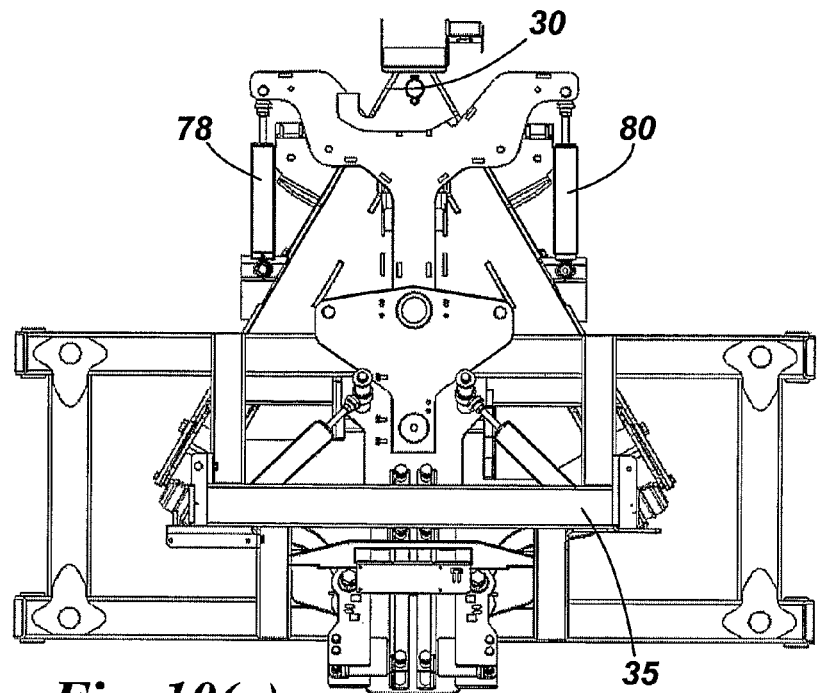
FIG. 10 is a rear view of the assembly of FIG. 9 showing the support frame displaced with different degrees of swing.
Figure 10B:
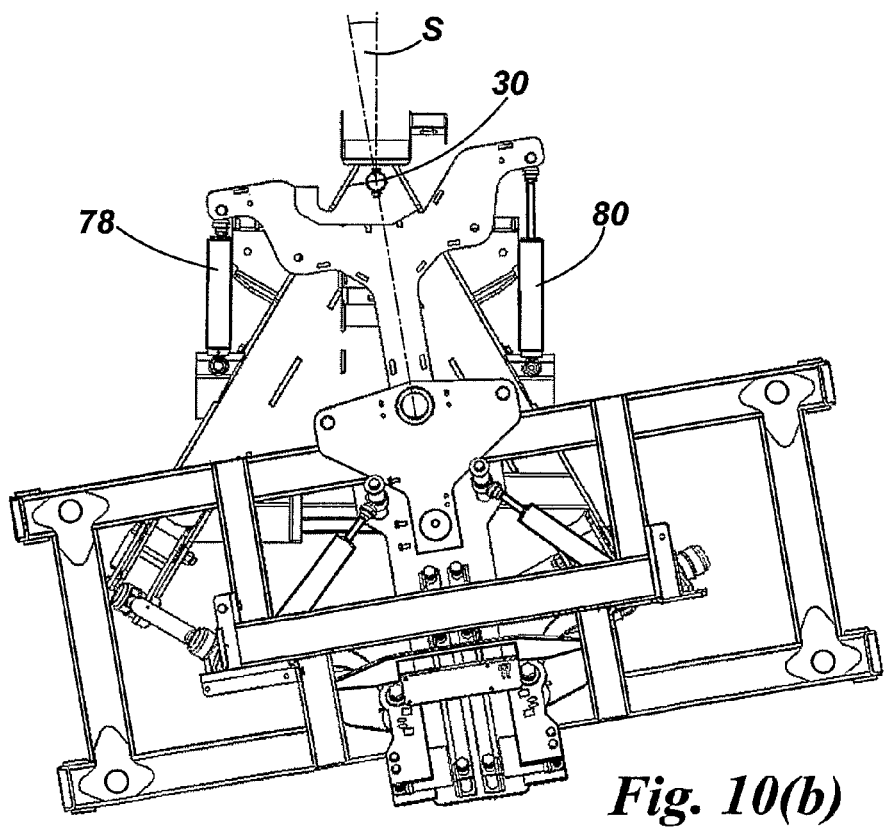

With reference to FIG. 10, roll movement of the boom support frame 22 away from a neutral position is damped by dampers 78, 80. FIG. 10a shows the boom support frame 22 in a neutral, or central, position whereas FIG. 10b shows it with roll displacement to the right at an angle S, that is movement around a longitudinal axis that passes through the ball joint 30.

It should be appreciated that FIGS. 8 to 12 do not show the levelling cylinder 74 shown in the previous embodiment. However, a levelling cylinder will typically be provided between the transverse member 68 and the lower portion of boom support frame 22.

Figure 9:
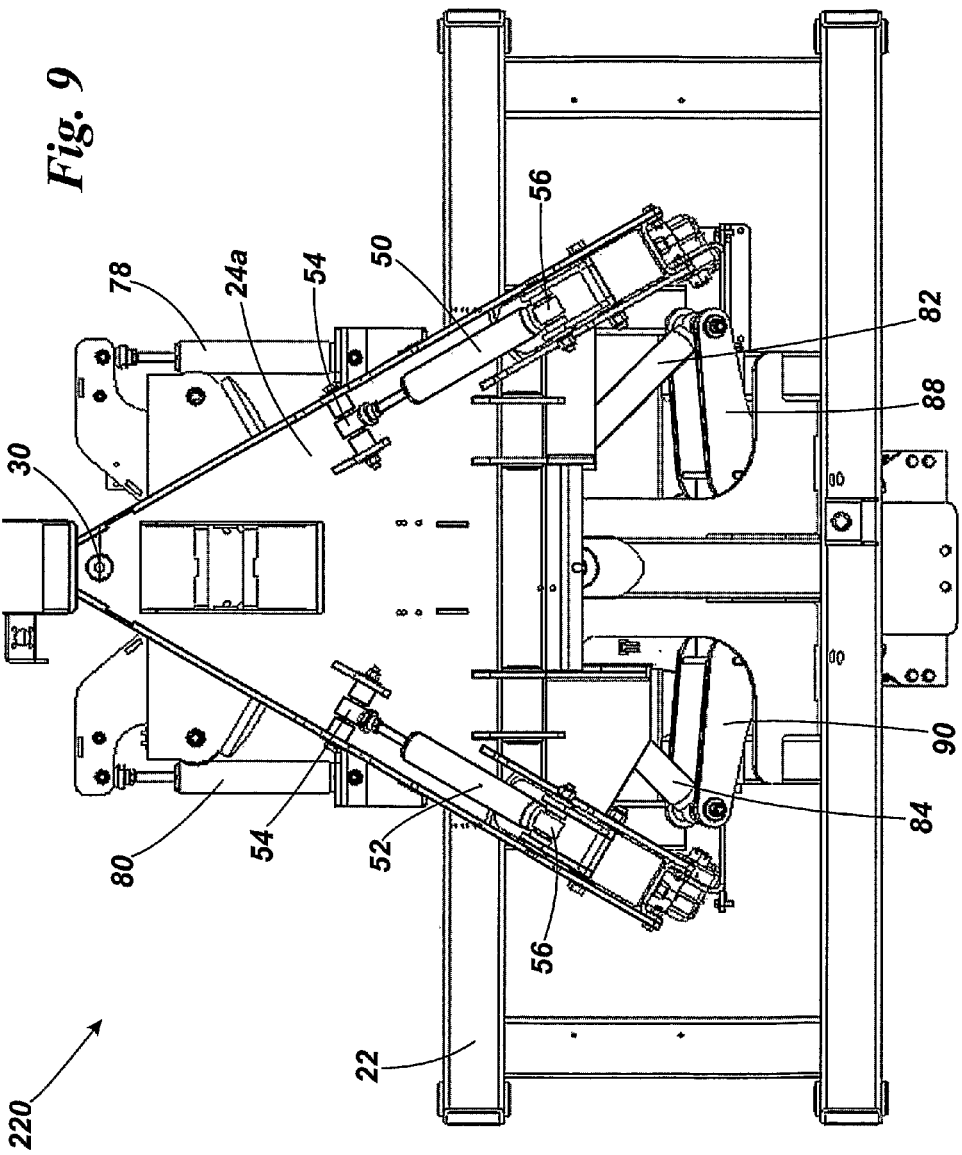
FIG. 9 is a front view of the assembly of FIG. 8.

First and second dampers 50, 52, as shown in FIG. 9, are each connected between an upper fixing point 54, attached to the primary frame 24, and a lower fixing point 56 associated with the elbow bracket 58. Each of the upper and lower fixing points 54, 56 include a pin held in position to which the respective end of the damper is pivotally mounted. The dampers 50, 52 are aligned at an incline with respect to longitudinal, transverse and vertical axes wherein the upper fixing point 54 is disposed rearward from, inward from and above the lower fixing point 56. By mounting the dampers with a vertical component, the oil contained therein is retained on the desired side of the piston thus allowing a more basic, and thus cheaper, damper component to be used.

Figure 11A:
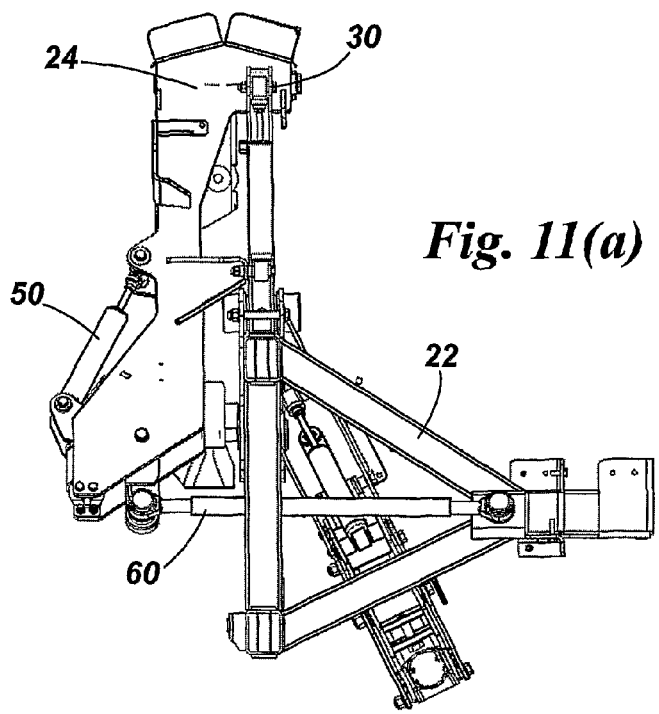
FIG. 11 is a side view of the assembly of FIG. 9 showing the support frame displaced with different degrees of pitch; and, FIG. 12 is a plan view of the assembly of FIG. 5 showing the support frame displaced with different degrees of yaw.
Figure 11B:
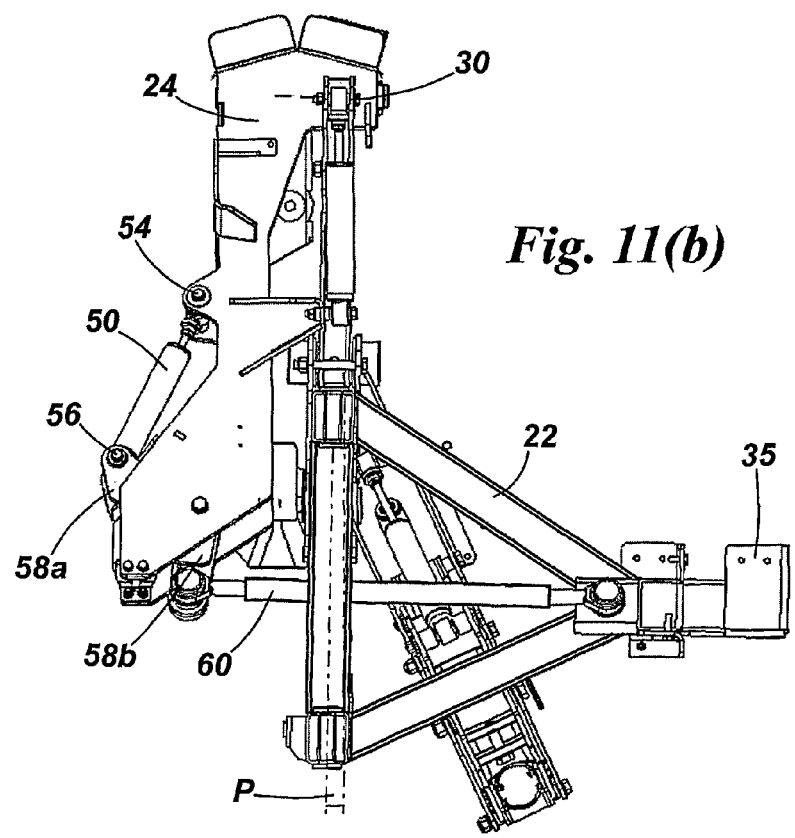

With reference to FIG. 11, pitch movement of the boom support frame 22 away from a neutral position (FIG. 11a) is damped symmetrically by dampers 50, 52. FIG. 11b shows the boom support frame 22 displaced forwardly relative to the primary frame 24 by angle P around a transverse axis that passes through the ball joint 30.

Figure 12A:
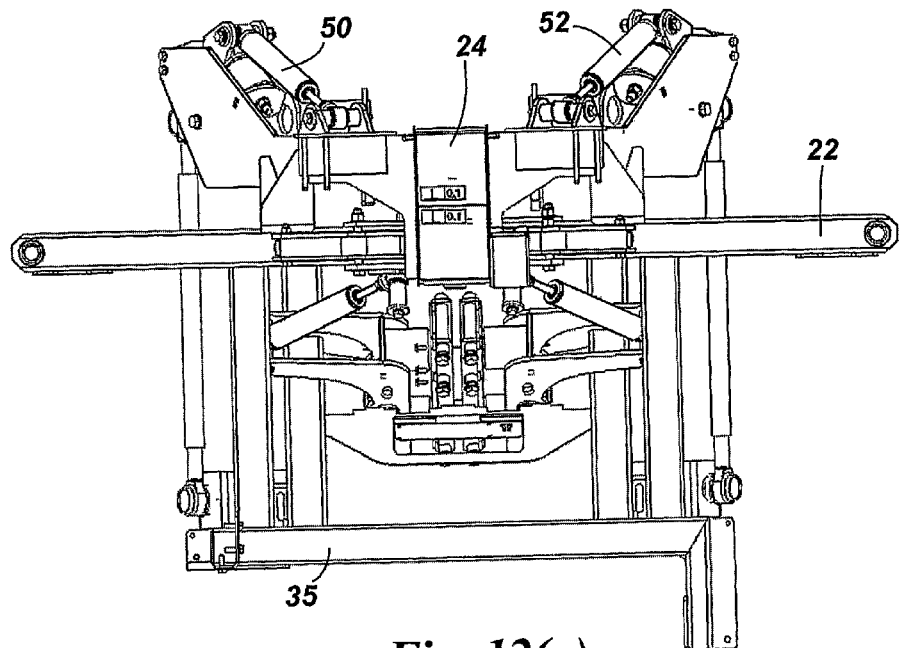
Figure 12B:
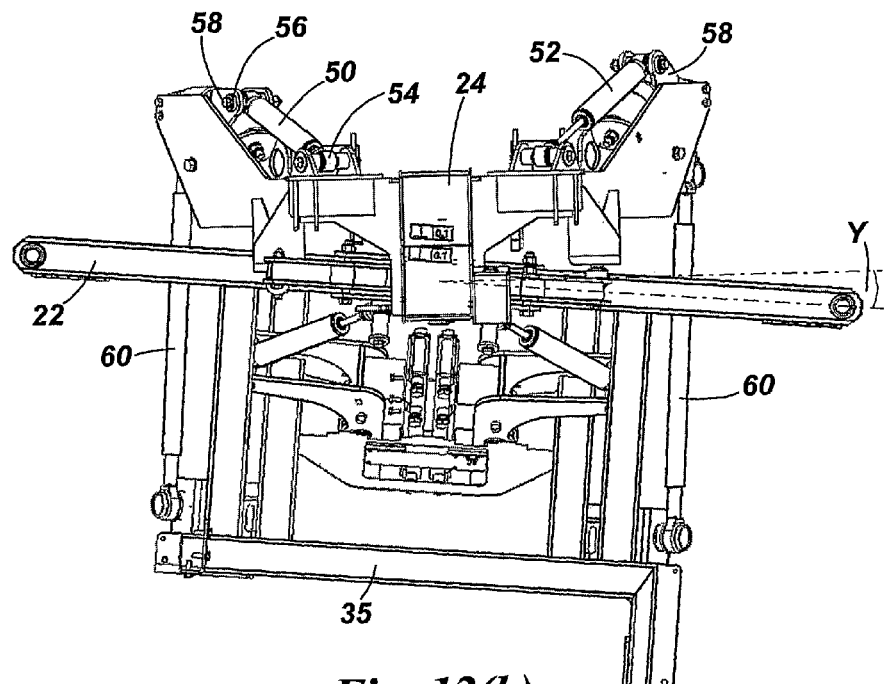

With reference to FIG. 12, asymmetric yaw movement of the boom support frame 22 away from a neutral position (FIG. 12a) is damped by dampers 50, 52. FIG. 12b shows the boom support frame displaced by angle Y around a vertical axis that passes through the ball joint 30.

Referring back to FIG. 8, a key enhancement present on the assembly shown is the provision of damping for symmetrical yaw of the boom 16. It has been recognised that the boom 16, due to its geometry (particularly its length), can oscillate symmetrically along its length within a horizontal plane. Such oscillations of the boom 16 can be considered relative to the boom support frame 22 and transverse beam 35 to which the boom 16 is mounted. The natural oscillation frequencies associated with asymmetric yaw and symmetric yaw are different because each degree of freedom is associated with a different portion of the boom and, in turn, moment of inertia. A standing wave, and its harmonics, associated with one half of the boom length will have a different wavelength to that associated with the full length of the boom. The inventor has recognised that a single pair of dampers cannot be tuned to cater for both asymmetric and symmetric yaw movement.

The boom mounting assembly 220 attempts to isolate the symmetrical yaw movement of the boom from the asymmetric and pitch displacements of the boom support frame 22, and damp said symmetrical yaw movement independently.

Fifth and sixth dampers, 82 and 84 respectively, are each connected at one end to a bracket 86 which is fixed relative to boom support frame 22. At their respective other ends fifth and sixth dampers 82, 84 are each pivotally connected to a respective symmetrical yaw linkage element in the form of an elbow bracket 88, 90 which, in turn is connected to a respective half of the boom 16 via a rigid connection member (not shown). Each elbow bracket 88, 90 rests upon a pair of rubber stops 94 which are fixed to a common central support member 95 and absorb vibrations transmitted thereupon.

It will be appreciated that the assembly 220 includes springs to act upon the various degrees of freedom of the boom so as to return the boom 16 back to a neutral position. For example, the central support member 95 houses a pair of springs which force the elbow brackets 88, 90 into a neutral position.

Each elbow bracket 88, 90 is pivotable around an axis that is disposed between 15 and 35 degrees to the horizontal, typically about 25 degrees to the horizontal. The pivoting motion of left-hand elbow bracket 88 permits transmission of symmetrical yaw in the left-hand portion of boom 16 to the damper 82. Similarly, the pivoting motion of right-hand elbow bracket 90 permits transmission of symmetrical yaw in the right-hand portion of boom 16 to the damper 84.

The damping force offered by each of the fifth and sixth dampers 82, 84 is greater than the damping force offered by each of the first and second dampers 50, 52.

Vibrations caused by driving over uneven terrain are damped by fifth and sixth dampers 82, 84 to avoid transmission from the wheels to the boom. This prevents oscillations of the boom setting up at natural harmonics associated with the boom length. Therefore, the additional damping apparatus provided in FIGS. 8 to 12 is particularly beneficial to longer booms which are more susceptible to motion induced vibrations, and in particular symmetrical yaw.

In summary, there is provided boom mounting assembly for attachment to an agricultural application machine. The assembly comprises a boom support frame which is suspended from a primary frame mounted to a chassis. The boom support frame comprises a transverse beam for supporting an intermediate section of a fluid application boom. The suspension mechanism allows both symmetrical and asymmetrical displacements of the intermediate section about a longitudinal vertical plane resulting from fore and aft forces on the boom. Dampers are provided and arranged to independently damp both fore and aft movement of respective ends of the transverse beam away from a neutral position thereby damping both symmetrical and asymmetrical oscillations in a horizontal direction.

From reading the present disclosure, other modification will be apparent to persons skilled in the art. Such modifications may involve other features which are already known in the field of agricultural application machines and component parts therefore and which may be used instead of or in addition to features already described herein.

The invention claimed is:

1. A boom mounting assembly for attachment to an agricultural application machine, the assembly comprising a boom support frame which is suspended from a primary frame mounted to a chassis, the boom support frame comprising a transverse beam for supporting an intermediate section of a fluid application boom and being suspended so as to allow yaw and pitch of the boom support frame relative to the primary frame, the assembly further comprising a first and a second damper each connected between the primary frame and the boom support frame at a position spaced from the transverse center of the assembly, wherein damping of pitch and asymmetrical yaw movement of the transverse beam away from a neutral position is controlled by the first and second dampers;

the boom mounting assembly further comprising a fifth and sixth damper to damp symmetrical yaw movement of the fluid application boom relative to the support frame, wherein said fifth and sixth damper are each connected between the boom support frame and a respective symmetrical yaw linkage which is connected to a respective half of the boom; and wherein each of the first and second dampers is connected between the primary frame and a respective elbow bracket which is pivotally attached to the primary frame, and wherein each bracket is connected to a respective end of the transverse beam by a strut so that fore and aft movement of the beam is translated into at least partial vertical force upon the first and second dampers.

2. An assembly according to claim 1, wherein the dampers each comprise a fluid-filled cylinder with a piston moveable therein.

3. An assembly according to claim 2, wherein the cylinders provide a passive damping function.

4. An assembly according to claim 1, wherein a fluid pressure within each cylinder is adjustable to provide an active damping function.

5. An assembly according claim 1, wherein the boom support frame is suspended so as to allow the transverse beam to swing in a transverse vertical plane about the point of suspension.

6. An assembly according to claim 5, wherein the boom support frame is suspended from the primary frame by a ball joint which permits three degrees of freedom, namely yaw, pitch and swing movement.

7. An assembly according to claim 6, further comprising damping means to damp said swinging movement in the transverse vertical plane away from a neutral central position.

8. An assembly according to claim 7, wherein the boom support frame comprises a transversely extending member and wherein the damping means comprises third and fourth dampers each connected between the primary frame and respective ends of the transversely extending member.

9. An assembly according to claim 7, wherein the boom support frame comprises an upper portion which is suspended from the primary frame and a lower portion which includes the transverse beam, wherein the lower portion is pivotally attached to the upper portion so as to allow relative pivoting movement in a transverse vertical plane.

10. An assembly according to claim 1, wherein each symmetrical yaw linkage is pivotable within a range determined by a pair of stops fixed relative to the boom support frame, and wherein pivoting movement of the symmetrical yaw linkage is damped by the fifth and sixth dampers.

11. An assembly according to claim 10, wherein each symmetrical yaw linkage is pivotable around an axis that is disposed between 15 and 35 degrees to the horizontal.

12. An assembly according to claim 1, wherein each symmetrical yaw linkage comprises a two-legged elbow element, wherein one of the fifth and sixth dampers is connected to a first leg of the elbow element, and a respective half of the boom is connected to a second leg of the elbow element.

13. An assembly according to claim 1, wherein the damping force offered by each of the fifth and sixth dampers is greater than the damping force offered by each of the first and second dampers.

* * * * *